United States Patent [19]

Williams et al.

[11] Patent Number: 5,410,688
[45] Date of Patent: Apr. 25, 1995

[54] DISTRIBUTED OBJECT BASED SYSTEMS FOR COMMUNICATING OBJECT DATA AMONG DIFFERENT STORAGE DOMAINS

[75] Inventors: Peter M. Williams, Gloucerstershire, United Kingdom; Ralph L. Carpenter, Auburn, Calif.; Simon J. Form, Bristol, United Kingdom; Jonathan A. Weiner, Palo Alto; Brian W. McBride, Los Altos, both of Calif.; Edmund F. Davies, Reading, United Kingdom

[73] Assignee: Hewlett-Packard Company, Palo Alto, Calif.

[21] Appl. No.: 553,879

[22] Filed: Jul. 16, 1990

[30] Foreign Application Priority Data

Jul. 21, 1989 [EP] European Pat. Off. .......... 89307458

[51] Int. Cl.$^6$ .................. G06F 15/40; G06F 13/00
[52] U.S. Cl. ..................... 395/600; 395/200; 364/282.4; 364/974.7; 364/DIG. 1; 364/DIG. 2
[58] Field of Search .............. 395/600, 650, 200, 700, 395/425; 364/DIG. 1, DIG. 2

[56] References Cited

U.S. PATENT DOCUMENTS

| | | | |
|---|---|---|---|
| 3,534,338 | 10/1970 | Christensen et al. | 364/200 |
| 4,635,189 | 1/1987 | Kendall | 395/600 |
| 4,694,396 | 9/1987 | Weishaar et al. | 395/200 |
| 4,750,150 | 6/1988 | Weppler | 395/275 |
| 4,831,541 | 5/1989 | Eshel | 364/200 |
| 4,835,685 | 5/1989 | Kun | 395/650 |
| 4,896,291 | 1/1990 | Gest et al. | 395/196 |
| 4,939,507 | 7/1990 | Beard et al. | 340/706 |
| 4,953,080 | 8/1990 | Dysart et al. | 395/600 |
| 5,008,853 | 4/1991 | Bly et al. | 395/153 |
| 5,014,192 | 5/1991 | Mansfield et al. | 395/600 |
| 5,057,996 | 10/1991 | Cutler et al. | 395/650 |
| 5,079,695 | 1/1992 | Dysart et al. | 395/700 |

OTHER PUBLICATIONS

The Eden System: A Technical Review; Guy T. Almes, et al.; IEEE Transactions on Software Engineering, vol. SE-11, No. 1, Jan. 1985; pp. 43-58.

Object Structure in the Emerald System; Andrew Black, et al.; OOPSLA '86 Proceedings; Sep. 1986; pp. 78-86.

The Andrew Toolkit-An Overview; Andrew J. Palay, et al.; Information Technology Center, Carnegie Mellon University, Pittsburgh, Pa. 15213; pp. 1-15.

User-Interface Toolkits in the UNIX Environment: Perspective of Andrew Toolkit Developers; Andrew J. Palay, Alfred Z. Spector; Information Technology Center, Carnegie Mellon Univ., Pittsburgh, Pa. 15213; Mar. 11, 1988; Revised Draft of Apr. 6, 1988.

M. Shapiro, "Structure and Encapsulation in Distributed Systems: The Proxy Principle", *The 6th International Conference on Distributed Computing Systems*, Cambridge, Mass., May 19-23, 1986, pp. 198-204.

P. Chrysanthis et al., "The Gutenberg Operating System Kernel", *Proceedings Fall Joint Computer Conference*, Dallas, Tex., Nov. 2-6, 1986, pp. 1159-1168.

Xerox, VP Series Reference Library Version 1.0, Xerox Corporation, (El Segundo, Calif., 1985) pp. i-vi, 1-60.

*Primary Examiner*—Thomas G. Black
*Assistant Examiner*—Paul R. Lintz

[57] ABSTRACT

An object based data processing system comprising a plurality of storage domains arranged so that a semantic object in a second storage domain can be accessed by the user of a first storage domain by the creation of a new presentation object in the first storage domain which is linked via a transient communication link to the semantic object in the second storage domain. Each storage domain includes a global object into which the user of the storage domain can place objects to be made accessible to other storage domains and a distributed object containing the global objects of all other storage domains. By opening a distributed object in any storage domain, the user is given access to the global objects of other storage domains, including those of other users.

10 Claims, 4 Drawing Sheets

DISTRIBUTED OBJECT BASED SYSTEMS FOR COMMUNICATING OBJECT DATA AMONG DIFFERENT STORAGE DOMAINS

BACKGROUND OF THE INVENTION

1. Field of the Invention

The present invention relates to object based computer systems, and more specifically, to object based computer systems having a plurality of stations.

2. Description of the Prior Art

An object based system is a computer system for processing data organized in units termed objects. Typical objects are textual documents, drawings, and spreadsheets. These objects correspond to the files of more conventional systems, but one essential feature of objects is that each object functionally includes the processing arrangements required for that object. Thus, a document object includes a word processor, a folder object includes means for organizing documents, etc. A spreadsheet object will often include a variety of alternative means of displaying its contents, e.g. tabular displays, bar charts, and pie diagrams.

A further essential feature of an object based system is that objects can include each other (though loops are not normally allowed); this relationship is known as a parent-child relationship. Thus, a folder object can include a number of document objects, a document object can include a spreadsheet object and a drawing object, and so on. The significance of this is that individual objects can be constructed independently and then linked together to form a compound object. Hence, if a spreadsheet object is changed, e.g. by altering some of the figures in it, not only will the rest of the figures in the spreadsheet be updated, but also the figures copied into parent objects such as documents will be automatically updated. Such links are permanent in the sense that once created, they persist until some positive action is taken to destroy them. (In particular, they persist when the system is shut down and later re-started.)

An object based system comprises, in addition to a plurality of objects, an object management facility which organizes the objects and the relationships between them. The object management facility maintains a list of objects in the system and a list of which objects are active. It also maintains lists of links between objects, i.e. which objects include which (genealogical tables). In principle, this link information is held in the objects themselves. In practice, however, it is convenient for this link information to be held in portions of the objects which are separated from the main bodies of the objects and kept together in lists which can be manipulated by the object management facility. This enables housekeeping to be done more easily. For example, if a user tries to include one object in another, one housekeeping task is to check that this does not result in a closed loop, and it is easier to do this if the linkages are in a linkage table than if the various branches of the tree of included objects (descendants) have to be traced by extracting information from each of the objects in the tree.

A specific object based system is described in detail in U.S. Pat. No. 4,953,080, filed Apr. 25, 1988, entitled "Object Management Facilities for Maintaining Data in a Computer System" in the names of John Andrew DYSART, Peter Stuart SHAWMAN, William M CROWE, Charles H WHELAN, Peter M WILLIAMS, Brian W MCBRIDE, Brian MURDOCH, and John RF SENIOR, and assigned to Hewlett-Packard Company, the text of which is hereby incorporated by reference in its entirety.

The present invention is primarily concerned with the organization of an object based system having a plurality of user stations. Such a system may be provided by a single central processing device having a plurality of user stations coupled to it, or it may be provided by a distributed processing network consisting of a number of independent processing units each having a respective station associated with it. However, the invention is also concerned with an object based system having a plurality of storage domains supported on a single station.

A number of problems arise in a distributed processing network of the type to which the invention is directed in comparison with single-station systems. One problem is what happens if two separate users attempt to work on the same object. This problem can be dealt with by suitable design of the objects—either an object is designed so that two users can work on it simultaneously, or it is designed so that once one user is working on it, other users will not be allowed to work on it at the same time. More generally, there is the problem of what happens if there is some interaction between what the two users are doing as when one user is manipulating the figures in a spreadsheet object and another user is using some of those figures in a text object. This problem is relatively easy to deal with, since means are necessarily provided whereby a parent object can obtain information from an included (child) object. What is needed is, in essence, for the child to keep track of what information the parent has obtained from it, and, if that information changes, to send the updated information to the parent. (The child could, for example, send an update on every change of its own information.) The parent will have means for incorporating the information obtained from the child into itself, and must be able to update itself when that information changes. (The parent could in effect reinitialize itself every time it receives an update from the child.)

In addition to these problems, which are obvious, there are more subtle problems. It is these latter problems with which the present invention is primarily concerned. For example, if the system is a distributed processing system, the number of active stations in the system will vary as different users switch their stations on and off. Hence, which objects are available to a given user will vary. The user's own objects—those on the user's own processor—will of course always be available, but other users' objects will sometimes be available and sometimes not. Further, the system configuration will also change as users switch on and off. It also will be desirable for users to be able to pass objects between themselves, so the location of a given object may vary from time to time. There will be similar phenomena in a single-processor system as different users log on and log off provided that the users own their objects and access to them is only permitted while the owner is logged on.

Accordingly, there is a long-felt need for a multi-station object based system which overcomes the above-mentioned problems. The present invention has been designed to meet this need.

SUMMARY OF THE INVENTION

A major aspect of this invention relates to the manner in which the system supports communication between users. Another aspect of the invention is concerned with the manner in which links between objects belonging to different users are constructed. A further aspect of the invention is concerned with the manner in which each user is informed of which objects of other users are available to him or her.

According to a first aspect of the present invention we provide an object based data processing system comprising a plurality of storage domains arranged so that a semantic object in a second storage domain can be accessed by the user of a first storage domain by the creation of a new presentation object in the first storage domain which is linked to the semantic object in the second storage domain. As herein used, a "semantic object" is a permanent information-containing object; a "presentation object" is an interfacing object for enabling the contents of a semantic object to be operated upon; and a "storage domain" is closely equivalent to a floppy disc in the sense that all objects in a given storage domain are on line together or are off-line together. Consequently, a single machine may support a plurality of storage domains.

The invention provides means for enabling the user working in a first storage domain to access objects in a second storage domain and to manipulate the contents of objects in the second storage domain. The invention is applicable to a single machine having multiple storage domains and therefore a single user at any one time or to a plurality of machines having a plurality of users at any one time or to a single central processing device having a plurality of user stations coupled to it.

Preferably, the system is configured so that the new presentation object in the first storage domain is created by an existing presentation object in the first storage domain using information received from the semantic object or a parent of the semantic object. More specifically, a new presentation object is created by an existing presentation object in the first storage domain which is linked to a semantic object in the second storage domain which is a parent of the semantic object, and a link is formed between the new presentation object and the semantic object by passing object identification information from the existing presentation object to the new presentation object.

Importantly, these features have the advantage that the semantic object in the second storage domain does not need to know the identity of the first storage domain. Another, although lesser, advantage is that the data traffic between the first and second storage domains is reduced. In the case where there are a plurality of storage domains on a single machine this means that the semantic object to be accessed does not need to know which screen/display surface its corresponding new presentation object should appear on. Yet another advantage of the arrangement referred to above is that it is applicable to distributed and non-distributed object-based systems.

The arrangement described above requires the existence of a top level presentation object and a top level semantic object in the first and second storage domains, respectively, and the establishment of an initial link between these objects. Preferably, each storage domain comprises a global object for containing objects to be made accessible to the users of other storage domains, a distributed object linked to the global objects of all other storage domains and data communication means for communicating with all other storage domains so as to obtain a list of the global objects held on the other storage domains. In the embodiment to be described, the global object is termed the "outer office" and the distributed object is termed the "corridor". In this specification, the term 'global object' shall mean an object which is 'well known' in the system, i.e., it is accessible to all users. The term 'master object' shall be used to denote an object which contains all the other objects in its particular storage domain. In the embodiment to be described, the master object is termed the 'inner office'.

Preferably, the data communication means are themselves objects (datacom objects). Alternatively, the data communications means could be embodied within the object management facility for the system.

According to another aspect, the present invention provides an object based data processing system comprising a plurality of storage domains, characterized in that each storage domain includes:

a global object into which the user of the storage domain can place objects to be made accessible to other storage domains and a distributed object containing the global objects of all other storage domains, the opening of which in any storage domain gives access to the global objects of other storage domains. Preferably, the system further comprises data communication means for communicating with all other storage domains to obtain from the other storage domains a list of the global objects held in those other storage domains. This aspect is particularly applicable to a data processing system comprising a network of stations.

In this system, there is thus no absolute addressing required or even available for links from the objects of one storage domain to those of another. Instead, the data communication means provides a table of addresses for currently available global objects of other storage domains, and links between other objects are constructed by looking up the addresses of the new objects and passing them down the chain. Preferably, the data communication means are themselves objects (datacom objects). Alternatively, the data communications means could be embodied within the object management facility for the system.

According to a further aspect, datacom objects are provided which maintain continuous monitoring of the system so as to discover which other storage domains are available and copy the addresses of the datacom objects of other storage domains.

These arrangements have a very important consequence; there are no permanent links between objects on different storage domains. It follows from this that a user working in one storage domain cannot make an object on a different storage domain a child of an object of his or her own storage domain (or vice versa). The user must copy the remote object onto his or her storage domain; the copy can then be linked with other objects on that storage domain.

It will be seen that in the present system, objects in general refer to other objects. (by means of links) and are not concerned with identifying the storage domains in which the objects happen to be located. The identification of an object with the storage domain in which it is located is the concern primarily of the datacom object, and to a small extent of the corridor object; these are the two objects involved in linking between storage domains. Apart from such special cases, objects do not need to name (identify) storage domains.

BRIEF DESCRIPTION OF THE DRAWINGS

An object based data processing system in accordance with the invention will now be described, by way of example, with reference to the drawings, in which.

DETAILED DESCRIPTION OF A PRESENTLY PREFERRED EMBODIMENT

Object Organization and Manipulation

Figure 1:
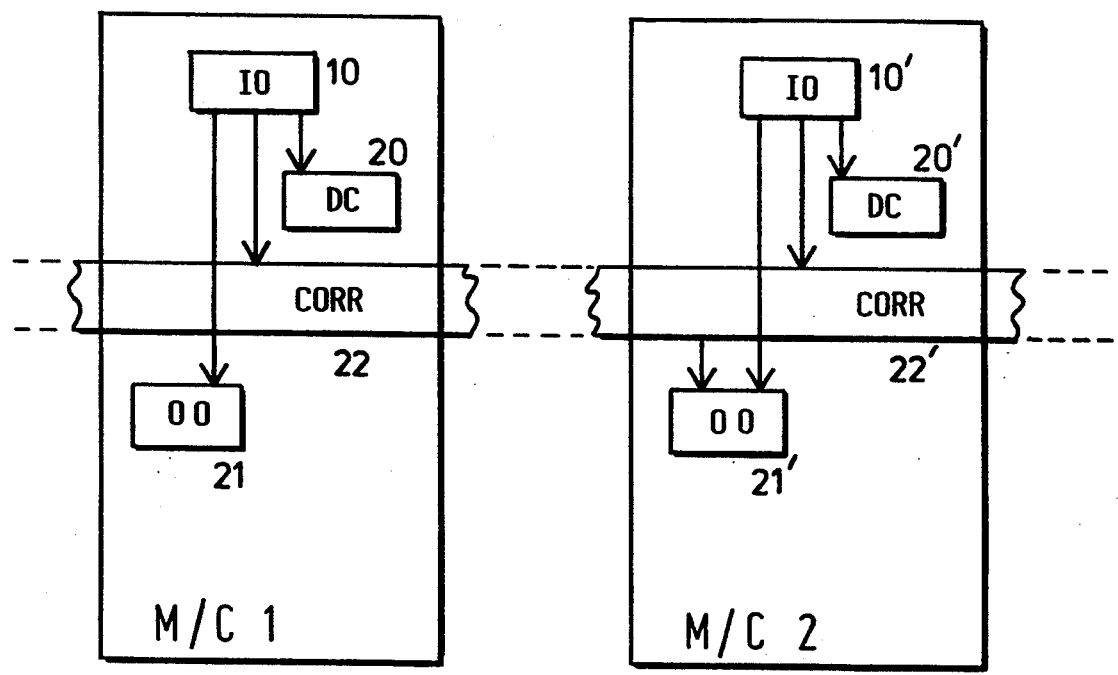
FIG. 1 shows one way of illustrating the relationship between two stations of the system.

A major feature of the present system is the manner in which objects are made available to users. To explain this, it is convenient to define and restate some terminology.

All the objects discussed so far are permanent information-containing objects and are more specifically termed semantic objects. If the contents of an object are to be operated on, then the object must be opened. When an object is opened, an interfacing object termed a presentation object is generally created (although there may be some types of objects for which a separate presentation object is not created when the object is opened). The opening of a (semantic) object generally results in its presentation object creating a window in which the object is displayed. Thus if the semantic object is a document, the window will normally contain the text of the document (or some part of the text). If the object is a folder, the display will normally be some form of listing of the objects contained in the folder.

The presentation object has a transient existence and cannot have children. There is a link between the presentation object and its semantic object, but this link is, like the presentation object itself, only transient; this is in distinction to the links of parent-child relationships, which are permanent. There is of course a substantial amount of interaction between a semantic object and its presentation object. Although the link between these two objects is a transient link, the interaction between them does not differ in quality from the interaction between a parent and child pair of objects linked by a permanent link.

A single-station system can operate very satisfactorily with the limitation that a given semantic object can have only a single presentation object. In effect, this restriction means that a semantic object cannot be opened twice. In a multi-station system, this limitation can be maintained, but it is more restricting in its effects than in a single-station system, as it means that only a single user can operate on a given object at any one time. In the present system, therefore, a semantic object can be opened by a plurality of users, and can have a corresponding number of presentation objects associated with it. The presentation object and its associated semantic object can be regarded as coupled together by an interface through which information passes. In the present system, a semantic object can support a plurality of such interfaces. Whereas a semantic object which can support a single interface monitors that interface for any information to be passed through it, a semantic object in the present system monitors its interfaces to all associated presentation objects.

It will be realized that this feature of the present system automatically permits a plurality of presentation objects to be opened onto a semantic object by a single user, who can therefore operate separately and effectively simultaneously on different parts of the semantic object. This allows a single user to open two or more different types of presentation objects on a single semantic object—e.g. a pie chart, a bar chart, and a numerical table on the contents of a spreadsheet.

It is conventional in object based systems for the objects to be represented to the user by icons on the station display. Thus, an electronic mail object may be represented by an icon showing a conventionalized envelope; the erase function may be represented by an icon in the form of a waste-paper basket; a document may be represented by an icon in the form of a page with one corner dog-eared; and so on.

An object is generally chosen for selection by moving a pointer, typically by means of a mouse, to point to the corresponding icon. The object can then be opened by a suitable action (typically a double click of a control switch or button on the mouse). This normally causes the icon to be emphasized in some way—typically by greying the icon (changing its background from the usual generally white shade to grey). (The icon will generally remain visible, or at least potentially visible, because the window in which the object is displayed will generally not occupy the whole of the display screen.) When the user has finished with the object, it can be closed by a suitable action (e.g. by clicking on a particular close area on the perimeter of the window or by a menu selection).

A user will not normally be aware that their communication with an object (a semantic object) is mediated by a presentation object, and when they close an object, they will normally imagine that they are closing the semantic object. In fact, the closing actually closes the presentation object, which then ceases to exist.

It will be realized that not all objects can necessarily be represented by icons or be displayable. For example, a presentation object will not normally be represented by an icon.

There is another way in which a user can interact with an object, in which the object is treated as a unit, e.g., for renaming or moving it. If the object is to be moved, this can generally be done by dragging the object around the display, e.g. to move a document object into a folder of documents, the wastepaper basket, or a mailbox. This is achieved by moving the pointer onto the object's icon, pressing down the button on the mouse, and holding the button down while the pointer is moved around the display by the mouse. If necessary, the object can be selected for some subsequent operation, e.g., by single clicking onto the object. (An object being operated on in this way generally has its icon changed in a distinctive way, e.g. by being shown in reverse video.)

When an object is moved or otherwise selected in this way, the object management facility updates the (permanent) links of the object, in response to messages generated by the object which has been selected. This process is described in more detail in the patent application mentioned above and incorporated by reference. In effect, the selection and subsequent manipulation have the effect of initially creating a temporary link, which must then be made permanent.

Communication Between Stations

The present system may have a plurality of stations. Means must therefore be provided whereby the stations have distinct identities but can nevertheless intercommunicate. The maintenance of distinct identities for the various stations is achieved by providing a local master object for each station, containing all objects owned by the user of that station. Intercommunication between the stations could be achieved by treating the entire system as consisting of a single global master object. However, such a global master object would not be well-defined, since the child objects contained in it vary from time to time, depending on which stations are in operation. In the present system, therefore, intercommunication between objects is achieved by including in each station a data communication (datacom) object. The function of the datacom objects is to maintain communication between different stations. This is achieved by the datacom objects of the active stations being permanently active, with information being continuously passed between them throughout the system. Each datacom object therefore maintains an up to date record of the state of all other stations in the system.

In a sense, each datacom object can be regarded as containing the datacom objects of all other stations as its children. It will be realized that this way of regarding the relationships between the datacom objects involves cyclic relationships. However, the construction of each datacom object is such that it divides its children strictly into two classes. As far as any investigation from within its own station is concerned, its only children are the datacom objects of other stations, and as far as any investigation from other stations is concerned, its only children are the other objects within its own station.

It is not essential for such intercommunication to be achieved by means of distinct objects (the datacom objects). The intercommunication functions could be performed by means of the object management facilities of the various stations. However, it is convenient for the intercommunication function to be separated out of the object management facility into distinct objects, the datacom objects, because the object management facility of each station is thereby simplified. The datacom objects can be designed as self-contained modules.

In a single-station system, the entire system is normally regarded as a single master object (often called the desk-top), which contains all other objects of the system (by means of chains of parent-child relationships). In the present system, each station has a local master object; this corresponds to the desk-top, but is here termed the inner office.

In addition to the intercommunication mechanism just discussed, some form of security mechanism is also essential, so that at a minimum, each user can segregate his or her own objects into private and public objects. In the present system, this is achieved by providing two further types of objects (in addition to the already existing types such as document, folder, wastebin, inner office, mailbox, spreadsheet, etc), which are here termed outer office and corridor.

The outer office and the corridor are special types or cases of a general class of folder objects, whose general function is to contain other objects. There are other terms which could be used for these two special objects with equal relevance; for example, the outer office could be called a public folder.

Thus, three specific objects exist at every station—the inner office, the outer office, and the corridor. The inner office is private, accessible only to the user of the station, while the outer office is accessible to all users of the system. The user of the station can move objects freely between the inner office and the outer office, thereby keeping them private or making them available to other users of the system as he or she wishes. The corridor is associated with the datacom object, and through it with the outer offices of all other active stations. (In one sense, the system can be regarded as having a single corridor which is distributed over the system, individual parts of it existing at the various active stations and being linked by means of the datacom objects.)

A user will normally work in his or her inner (private) office; that is, the user will open the inner office when starting a session. To put an object in the inner office into the outer office, the user will move the object into the outer office. (Of course, objects can be copied as well as moved.) To enter the outer office, the user moves the pointer to the outer office icon and opens the outer office. The user will then be presented with a display of the objects in the outer office. An object can be moved from the outer office to the inner office in the same way as it can be moved from the inner office to the outer office. To return to the inner office, the user moves the pointer to the inner office icon and enters the inner office. (The inner office, being the local master object, is normally open; to enter it, the user closes the outer office, so automatically reverting to the parent object, the inner office.)

To enter the corridor, the user moves the pointer to the corridor icon, and opens the corridor. The corridor object display is then generated, and this contains the outer offices of all users in the system. The user can then enter any selected outer office and observe its contents; that is, he or she can see what the contents are of the outer office of any active station in the system. The user can then either select or open any of these objects. (Selection enables the user to copy the object to his or her own station; opening enables the user to extract information from the object, or indeed to change the contents of the object.) If an object is copied, then the copy is of course a new object, which in this case will exist on the user's own station, as a child (directly or indirectly) of the user's own inner office (local master object). Any suitable icons may be used for the outer office and the corridor; convenient ones are a single door for the outer office and double door for the corridor.

The system thus involves the provision of a private area and a shared area at each station, together with an object by means of which the shared areas are made accessible to users at other stations. However, it will be realized that this basic arrangement may be subject to various enhancements to allow more flexible and elaborate security arrangements to be implemented. For example, the shared areas may be subdivided, and access control identifiers made available to selected stations, with the various subdivisions of the shared areas being available only to those users possessing the appropriate identifiers. The access may be full (read or write) or restricted to read only.

FIG. 1 illustrates a possible organization of objects and stations according to the invention. Two stations (machines) are shown, m/c 1 and m/c 2. Machine m/c 1 has its local master object, the desktop or inner office 10, which contains all other objects in that machine, including in particular the datacom object 20, the outer office 21, and the corridor 22 (and, of course, other objects not shown). The outer office 21 is a child of the corridor 22 as well as of the inner office 10. The datacom object 20 is permanently active and is not accessible to the user; it is concerned with communicating with other machines of the system. The outer office 21 can contain various objects which are put into and removed from it by the user. Machine m/c 2 has corresponding objects, shown with corresponding reference numerals which are primed.

The corridors 22 and 22' can be regarded as portions of a system distributed corridor which extends through both the two machines m/c 1 and m/c 2, and which contains the outer offices of all machines in the system. For practical reasons, this corridor is split into separate portions 22 and 22' on the two machines. The various portions of the corridor are coupled together by means of the datacom objects. As far as pure object management is concerned, the outer offices 21 and 21' in machines 1 and 2 are both children of the global corridor, and a user can move into any outer office via the corridor. In fact, however, such movement involves communications through the datacom objects.

Data Communication Objects

Figure 2A:
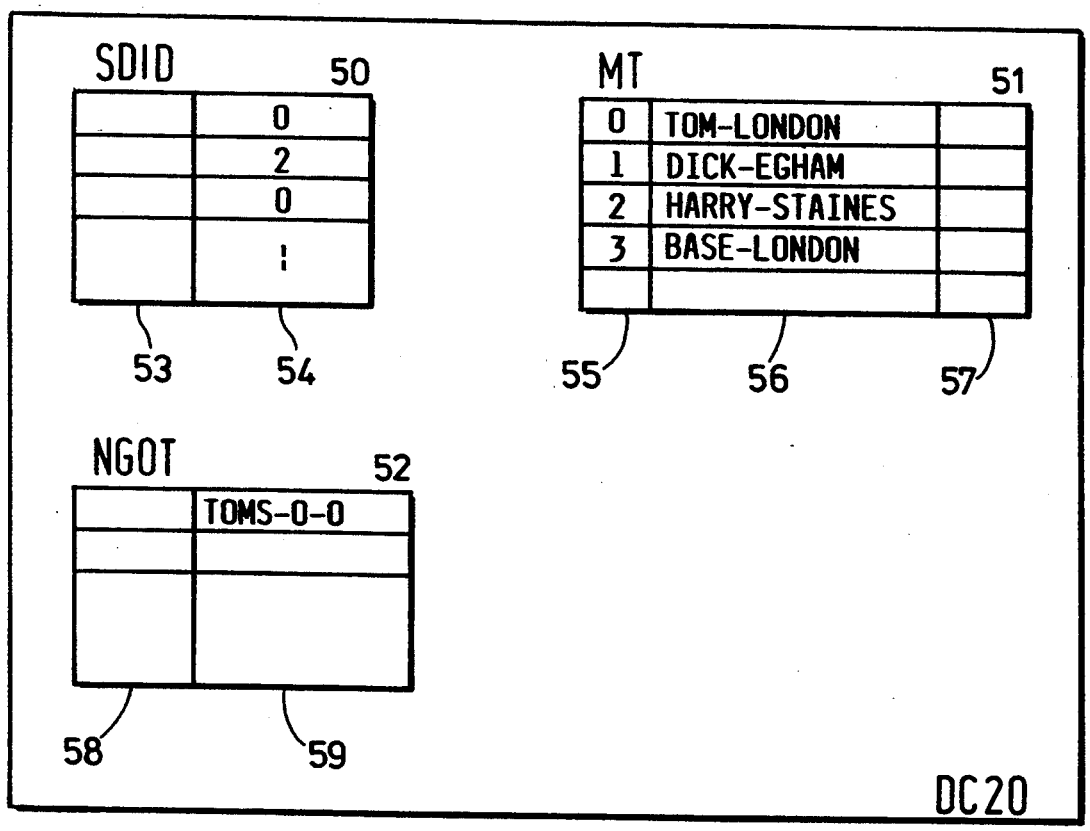
FIG. 2A shows certain tables contained in a corridor object of a station in the system.

A datacom object contains three storage tables: a storage domain identification table (SDID 50, FIG. 2A), a machine table (MT 51), and a network global object table (NGOT 52).

Each entry in the SDID table contains an SDID number (column 53) and a machine ID (column 54). In the present system, a single machine can support more than one storage domain. The SDID table thus associates each storage domain with a specific machine. The storage domains and machines are both given unique numberings.

Each entry in the machine table MT contains a machine number (column 55), a node name for the machine (column 56), and a flag indicating whether the machine is active or not (column 57). The various machines of the system are all connected to a communication network (not shown) of conventional type, in which the various nodes have distinctive names, and in which virtual circuits can be set up to establish communication between nodes. Thus, the MT table 51 associates the machine numbers used in the present system with the node names used by the communication system.

In the machine table MT, it is convenient for the entries to be in ascending order of machine number, with the local machine being the first entry (number 0). It is also convenient for the system to have one particular machine which is always active and to be given the second entry (number 1) in this table in all other machines. (In practice, the initial list is likely to be compiled manually; as further machines enter the system, so they will be added to the list automatically.)

The network global object table NGOT 52 lists all active network global objects. These are objects which are common to all stations of the network and directly accessible to all stations; in the present system, the various outer offices are such objects. Another possible example would be a printer object. Each entry in the NGOT table contains a temporary link value (column 58) and a subject identification (column 59). The temporary link is a value which can be used by any storage domain on the local machine to establish communication with an object on another machine, and the subject identification is the name of the network global object. Since the network global objects of the local machine are known to itself before it learns of those of other machines, the network global objects of the local machine are normally at the top of the list.

Figure 2B:
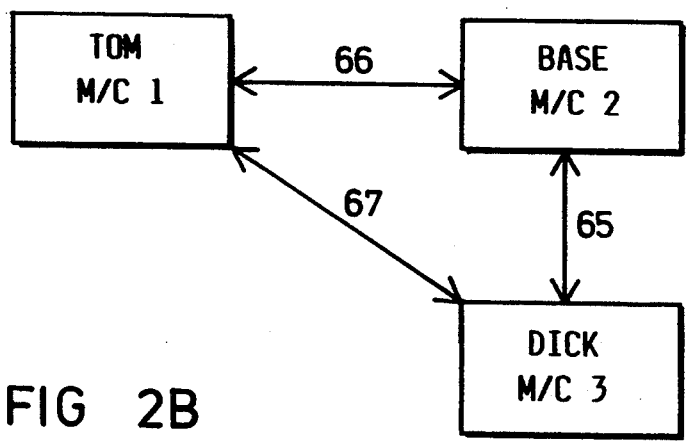
FIG. 2B illustrates the manner in which communication is initially established between stations.

The manner in which the datacom objects keep themselves updated can be described with reference to FIG. 2B. For example, suppose the machine 2, BASE, is always active, and that machine 3, DICK, has also been active for some time. In this state, a virtual circuit 65 will have been established between machines BASE and DICK. The MT tables will be as follows:

| BASE     | DICK     | TOM      |
| -------- | -------- | -------- |
| 0 - BASE | 0 - DICK | 0 - TOM  |
| 1 - DICK | 1 - BASE | 1 - BASE |

BASE and DICK are each aware of each other; TOM is not yet active, but its MT table contains itself and BASE.

Suppose that TOM now becomes active. On activation, the object management facility activates its datacom object, which proceeds to read down its MT table. It passes over the first entry, which is its own identification; the next entry it comes to is number 1, BASE. It therefore attempts to set up a virtual circuit to machine BASE. Since BASE is active, this attempt is successful, and the virtual circuit 66 is set up. TOM now sends its own name to BASE over this circuit, and BASE therefore adds TOM into its MT table. The MT tables thus become:

| BASE     | DICK     | TOM      |
| -------- | -------- | -------- |
| 0 - BASE | 0 - DICK | 0 - TOM  |
| 1 - DICK | 1 - BASE | 1 - BASE |
| 2 - TOM  |          |          |

BASE now sends a copy of its MT table to both TOM and DICK, which thereupon update their MT tables, so that the MT tables become:

| BASE     | DICK     | TOM      |
| -------- | -------- | -------- |
| 0 - BASE | 0 - DICK | 0 - TOM  |
| 1 - DICK | 1 - BASE | 1 - BASE |
| 2 - TOM  | 2 - TOM  | 2 - DICK |

DICK recognizes that TOM has been added to the system and thereupon attempts to establish a virtual circuit connection with TOM; TOM likewise attempts to establish a virtual circuit connection with DICK. A virtual circuit 67 between TOM and DICK is therefore established. (In fact, two circuits may be set up; each machine contains means for detecting this and abandoning one of them, first agreeing with the other machine which of the two should be abandoned.)

If a further machine becomes active, the system updates itself in broadly the same way. Each time a particular machine learns of the existence of a new one, it broadcasts its updated machine table to all other existing machines in the system. Of course, if an updating received by a machine does not add any new machine to the list in its MT table, it takes no action.

A machine can leave the system in two ways. First, it may close down in an orderly manner, informing all the other machines that it is closing down. The other machines then update their MT tables accordingly. They do not delete the closed-down machine from their MT tables; instead, they retain the entry but change the flag in column 57. Second, a machine may close down without informing other machines of the fact, perhaps as a result of a fault or of a failure of the communications system which maintains the virtual circuits between the machines. Some other machine will eventually discover that it is unable to communicate with the closed-down machine; it will then update its MT table, and broadcast the updating to the rest of the system (as for a new machine being added to the system), so that eventually all active machines in the system will become updated. Timers can be included to check the status of the virtual circuits so that if a machine closes down without informing the rest of the system, the fact is detected within a predetermined period.

If a machine which has closed down becomes active again, it will read down its MT table and attempt to establish virtual circuits with all the machines listed therein. It will therefore establish virtual circuits with all the active machines in the system. (In fact, an MT table consists of a preset initial configuration plus additional entries for any machines beyond the preset one or ones which are currently active. The initial configuration is stored permanently (on disc), but these additional entries are stored in volatile memory, and so are normally lost when the machine is closed down. The re-establishment of virtual circuits therefore involves first establishing them with the permanently configured machines, then with any further machines whose existence is discovered via the permanently configured machines.)

The newly active machine thus receives copies of the MT tables of all other active machines. This does two things. First, any machines in the system which are not already in the newly active machine's MT table are added to that table, and second, the flags in column 57 are updated. The attempt to establish virtual circuits with any inactive machines is thus abandoned. (This means that the responsibility for updating the system when a machine becomes active rests with that machine; there are no general inquiries from active machines to inactive ones to discover whether they have become active.)

In addition to the transmission of the MT tables between machines, the network global object tables (NGOTs) are also sent. Thus, the NGOT of each machine will contain a complete list of all network global objects; that is, of all the outer offices of all storage domains. When a corridor object is entered (opened) by a user, the contents—the outer offices of all other storage domains of the system—have to be obtained. This is done by the datacom object of the local machine, using its NGOT, which contains the required information for each object required. If the user then enters one of these objects, the temporary link is obtained from the NGOT, using a virtual circuit to another machine if necessary.

Although communication between machines has been described here in terms of virtual circuits, a variety of alternative techniques can obviously be used instead.

Link Establishment

Figure 3:
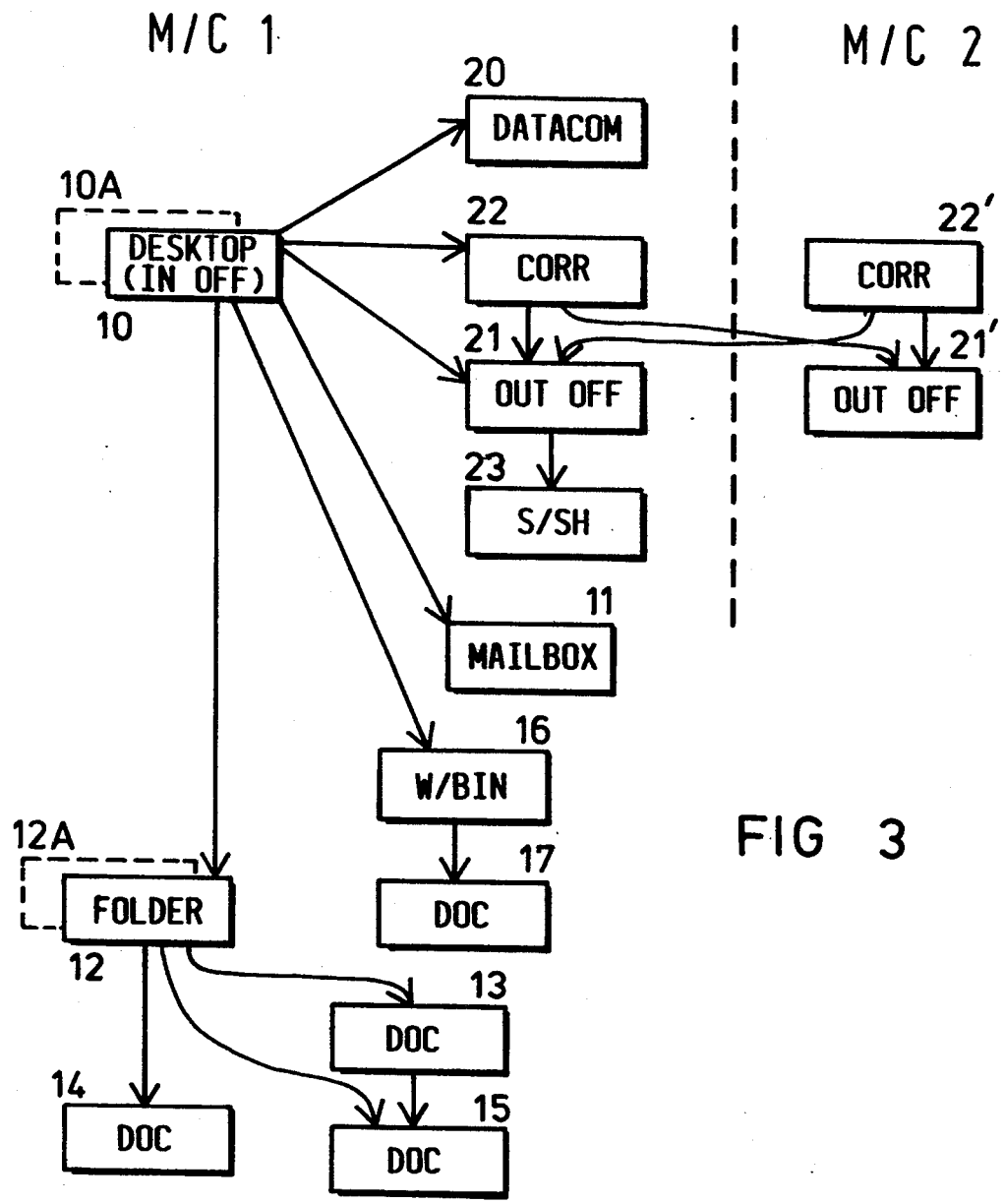
FIG. 3 shows typical objects in a station and another way of illustrating the relationship between two stations.

FIG. 3 illustrates the organization of objects and stations in more detail. The main part of the diagram shows a typical collection of objects at one station, machine 1 (m/c 1), of the system. The local global object of m/c 1, containing all the other objects of that station, is shown as block 10; this block would normally be termed the desktop, but in the present system can also be termed the inner office. This block contains the usual collection of objects of a desktop. A typical selection is shown, consisting of a mailbox 11, a folder 12 which contains three documents 13 to 15 (document 15 also being contained in document 13), and a wastebin 16 which contains a document 17.

In addition, the desktop (inner office) 10 contains three special objects—a datacom object 20, an outer office 21, and a corridor 22. The datacom object 20 is permanently active and is not accessible to the user; it is concerned with communicating with other machines of the system. The outer office 21 can contain various objects which are put into it and removed from it by the user; it is shown as containing a spreadsheet object 23. The corridor 22 also contains the outer offices of all the other machines of the system; only one other machine, m/c 2, is shown (only partially) here, containing its corridor object 22'. Each corridor in fact contains the outer offices of all machines, including that of its own machine. Thus, corridor 22 of machine 1 contains the outer office 21 of machine 1 as well as the outer office 21' of machine 2.

The objects described so far in FIG. 3 are all semantic objects. In the initial state of machine 1, the desktop is opened, and a presentation desktop object 10A exists. If the user decides to open the folder 12, a presentation folder object 12A is created. Each of these presentation objects is linked, by a transient link, to its associated semantic object, and is also linked to the child semantic objects of its associated semantic object. In the same way, the user can open the outer office 21 or the corridor 22, with corresponding presentation objects being created for these two semantic objects. (With the possible exception of some special presentation objects such as those for local and global master objects, presentation objects are created only by other presentation objects.)

If the user opens the corridor 22, then the contents of the corridor—the outer offices of all the other active machines of the system—have to be displayed. This information has to be obtained by the corridor 22 from the outer offices of the other active machines of the system, and for this, the corridor has to have the appropriate links to those outer offices. As noted above, in the present system no permanent links are maintained between different machines in the system. Instead, the datacom objects of the active machines are permanently active, and these objects are coupled to each other through virtual circuits. When the corridor object of a machine desires to communicate with another machine, the appropriate address (machine identification) is extracted from the datacom object 20 and inserted into the corridor 22. The corridor can then utilize the link to obtain the requisite information from the outer office 21' in machine 2. When the corridor is opened, of course, it has to obtain identification information from the outer offices of all the other machines in the system since its contents include all of those outer offices.

Figure 4A:
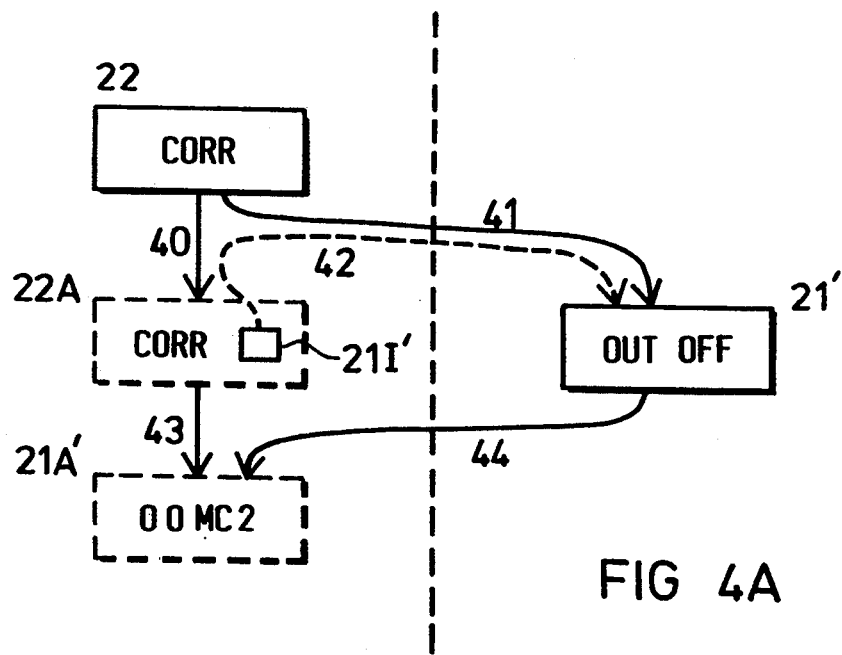
FIGS. 4A and 4B show how objects at one station are accessed from another station in accordance with the invention.

The corridor 22 effectively contains links to the outer offices of each of the other machines in the system. When the user (on machine 1) opens an object in the corridor, say the outer office 21' of machine 2, this is achieved as follows. Initially there is a semantic corridor 22 (FIG. 4A) in machine 1, linked by a link 40 to its associated presentation object 22A, and also linked by a link 41 to an outer office 21' in machine 2. The presentation corridor object 22A includes an icon 21I' which represents the outer office 21'.

The user opens the outer office 21' by double clicking the pointer (not shown) on the icon 21I'. The user will not normally be aware of the distinction between semantic and presentation objects, and as far as they are aware, the icon 21I' is linked in some manner to the outer office 21' by a link 42. When this outer office is opened, the corridor presentation object 22A creates, on machine 1, a presentation object 21A' for the outer office 21', together with a link 43 from the presentation corridor 22A to the presentation outer office 21A', and causes the presentation outer office 21A' to be displayed. The name of the outer office 21' is also obtained from the corridor 22, and that name (and the name of the presentation outer office 21A' which has just been created) is used to construct a link 44 between the semantic and presentation outer offices 21' and 21A'. The link 44 is constructed by the presentation outer office 21A sending a message to the outer office 21 causing the outer office 21 to insert the name of the presentation outer office 21A in its link relationship table (see below) so that objects 21 and 21A are then linked to one another. Thus, these two objects, the outer office 21' and its associated presentation object 21A', jointly possess the link 44 and can therefore communicate with each other (just like any pair of semantic and presentation objects). The link 43 from the presentation corridor 22A to the presentation outer office 21A' has now served its purpose, and is discarded.

Figure 4B:
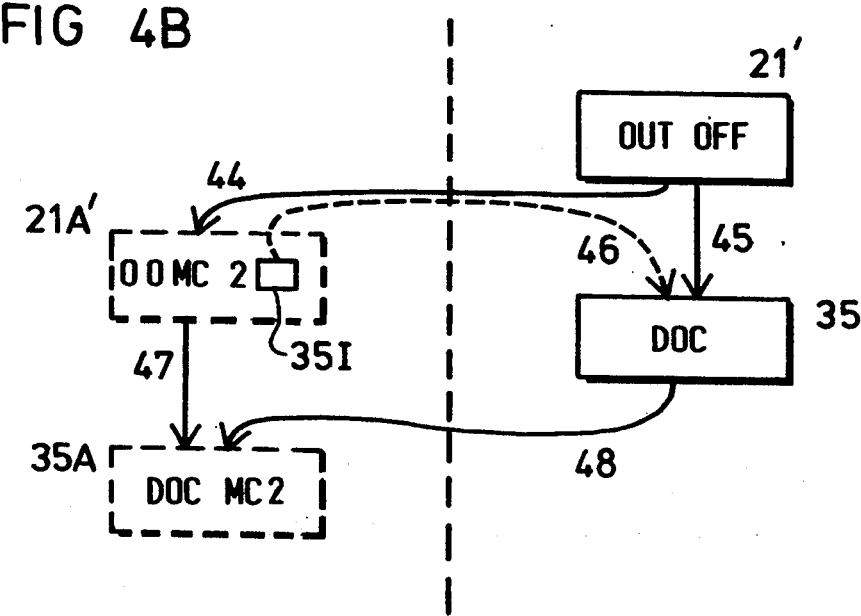

If the user then decides to open an object, say document 35, in the outer office 21', the same sequence of events occurs The user double clicks on the icon 35I in the presentation outer office 21A' (FIG. 4B). This icon is linked to the document 35 by the two links 44 and 45, forming a notional link 46. The presentation outer office 21A' in machine 1 creates a presentation document 35A with a link 47 from the presentation outer office 21A', uses the links 47, 44, and 45 to create a link 48 from the document 35 to its associated presentation document 35A, and then discards the link 47.

When the user has finished operating on the document 35, he or she closes it. The presentation object 35A sends a message to its semantic object 35 instructing the semantic object to terminate the link, i.e. to erase the relevant link block. This results in the transient link between the presentation object 35A and the semantic object 35 ceasing to exist. Also, the presentation object 35A itself ceases to exist.

It should be noted that substantially the same processes occur when a user opens an object on his or her own machine.

Link Implementation

When two objects are joined in a parent-child relationship by a permanent link, the link is formed by an entry in a link relationship table. This table is maintained by the object management facility, and is stored on disc, and therefore persists even when the machine is closed down and restarted. Each entry comprises three items: a reference name, a parent tag, and a child tag, the tags being the object management facility's names for the objects. The reference name is the name (i.e. a binary number) used by the parent object to identify the other object. This is described in the above-mentioned patent application incorporated by reference.

A child object does not itself contain any direct reference to its parent object or objects. When a child object wants to send a message to a parent object, it calls the object management facility, which thereupon searches the link relationship table to find the parent object.

Parent objects similarly do not usually contain direct references to their child objects; the object management facility is used in a similar way to find the child objects. However, a parent object can sometimes contain a direct reference to a child object; this will be in addition to the entry in the link relationship table defining the link from the parent object to the child object. In this case, the reference will be in the form of an object name for the child object. The first few bits of the object name form a scope portion. The scope is the type of the link: link types include, for example, temporary links (which are normally made permanent within a short time), permanent links with either local or global validity, etc. The interpretation of the remainder of the name depends on the scope of the name; in the case of a permanent link, the remainder of the name is the reference name of the child object.

When a new permanent link is being constructed, it may be constructed directly, or it may be preceded by the formation of a temporary link, having some temporary reference to the child object following the scope. In the latter case, a call is soon made to the object management facility, which thereupon replaces the temporary reference with a permanent reference name and inserts a corresponding entry in the link relationship table.

In the present system, where there are a plurality of stations, a user at one station can select and manipulate an object at a different station. The construction of any permanent links required, either directly or following the formation of a temporary link, is done by the object management facility at the station containing the object being manipulated, i.e. the remote station. If the manipulation is copying from one machine to another, then one of the object management facilities involved (either that of the machine on which the object is located or that to which it is being copied, depending on the details of the implementation) detects that another machine is involved, and sends a message to the data communication object of its machine to organize the copying from one machine to the other. In addition, all the children of the object are also copied to the new machine, so that the object retains its children but no inter-machine links are required.

If the manipulation involves creating a permanent link between the object and an object on another station, the object management facility detects the attempt to do this and intervenes, as this is not permitted in the present system. A message is issued to the user indicating that a forbidden manipulation has been attempted, and asking the user whether they are prepared to make a copy instead.

It would instead be possible for the object management facility of the object's original machine to determine whether the object (together with its children) has any links which would remain after the new link has been created, and move the object (together with its children) to the new machine automatically if no such links would remain on the object's original machine. The present procedure has, however, the advantages of simplicity and consistency.

Turning now to transient links, these links reside only in volatile memory and are therefore lost when the machine on which they exist is closed down. Further, there is no record of them kept outside the objects in which they exist. There is no link relationship table for them, and the object management facility has no direct access to them.

A transient link is another form of object name, having an initial scope portion which indicates that it is a transient link. The link has two further portions: a storage domain identifier and a tag portion. The storage domain identifier is the SDID number which has been discussed above, and the tag portion is a temporary identification of the linked object (child). The tag portion is assigned by the object management facility of the storage domain containing the object being linked. This structure is the same whether the link is between two objects in the same storage domain or two objects in different storage domains. If the transient link is one which is set up between different storage domains, then the SDID value and the tag identifying the object in that storage domain are obtained as described above with reference to FIGS. 4A and 4B.

If either end of a transient link is closed down properly, then the object being closed will send an appropriate message to the other object. This will usually occur when a presentation object is being closed, in which case it will send a message to its associated semantic object to delete the link from its list of object names, before the presentation object itself closes down and effectively ceases to exist. If communication is terminated by some other means, e.g., a failure of the communication medium between the two stations, then the failure may become apparent to one or both objects when they try to communicate with each other, and they will thereupon erase their object names for the link. Each station may be provided with means which maintains a list of those objects at that station which have links to other stations, and inform the relevant objects if communication to some other station is interrupted (such means may conveniently reside in the datacom object). If all else fails, the two ends of the link will disappear when the stations at those ends close down.

Although an exemplary embodiment of this invention has been described in detail above, those skilled in the art will readily appreciate that many additional modifications are possible in the exemplary embodiment without materially departing from the novel teachings and advantages of this invention. Accordingly, all such modifications are intended to be included within the scope of this invention as defined in the following claims.

We claim:

1. An object based computer system comprising:
   a first storage domain for storing an existing presentation object;
   a second storage domain for storing a semantic object; and
   a communications interface for enabling a user of the first storage domain to access said semantic object of said second storage domain by creating a new presentation object in the first storage domain which has a transient data-passing link to the semantic object in the second storage domain.

2. A system according to claim 1, wherein said new presentation object in the first storage domain is created by said existing presentation object in the first storage domain using information received from at least one of said semantic object in the second storage domain and a parent of said semantic object in the second storage domain via said interface.

3. A system according to claim 2, wherein said new presentation object in the first storage domain is created by said existing presentation object in the first storage domain, said existing presentation object in the first storage domain having a transient data-passing link to a parent semantic object of said semantic object in the second storage domain and said new presentation object in the first storage domain having a transient data-passing link to said semantic object in the second storage domain, by passing object identification information from said existing presentation object to said new presentation object in the first storage domain.

4. A system according to claim 1, wherein each of said first and second storage domains comprises:
   a global object for containing objects accessible to users of the other storage domain via said interface;
   a distributed object linked via a communication link of said interface to the global objects of the other storage domain; and
   data communication means for communicating with the other storage domain via said interface so as to obtain a list of the global objects held on the other storage domain.

5. A system according to claim 4, wherein each of said data communication means is a datacom object which continuously communicates which the other datacom object via said interface to determine whether the storage domain of the other datacom object is active.

6. A system according to claim 1, wherein said first and second storage domains are on different computers operated by different users.

7. A system according to claim 5, wherein said first and second storage domains are on different computers operated by different users and each of said datacom objects contains a list correlating each storage domain with a corresponding computer.

8. An object based computer system comprising:
   a communications interface; and
   a plurality of storage domains, each storage domain comprising:
      a global object into which a user of said each storage domain can place objects which are accessible to other of said plurality of storage domains via said interface;
      a distributed object linked via said interface to the global objects of all other of said plurality of storage domains, whereby the opening of said distributed object in said each storage domain provides access to the global objects of all other of said plurality of storage domains via said interface; and
      data communication means for communicating with all other of said plurality of storage domains via said interface to obtain therefrom a list of the global objects held therein.

9. A system according to claim 8, wherein said plurality of storage domains are respectively contained in a plurality of computers of a data processing network.

10. A system according to claim 8, wherein said plurality of storage domains are contained in a single computer.

* * * * *